United States Patent
Lowder et al.

(10) Patent No.: US 9,528,295 B2
(45) Date of Patent: *Dec. 27, 2016

(54) LOCKING DEVICE WITH INTEGRATED CIRCUIT BOARD

(75) Inventors: Scott B. Lowder, Orange, CT (US);
Todd C. Zimmer, Meriden, CT (US);
Jeff P. Tonon, Bristol, CT (US)

(73) Assignee: SARGENT MANUFACTURING COMPANY, New Haven, CT (US)

( * ) Notice: Subject to any disclaimer, the term of this patent is extended or adjusted under 35 U.S.C. 154(b) by 1229 days.

This patent is subject to a terminal disclaimer.

(21) Appl. No.: 13/391,025

(22) PCT Filed: Aug. 20, 2010

(86) PCT No.: PCT/US2010/046052
§ 371 (c)(1),
(2), (4) Date: Apr. 13, 2012

(87) PCT Pub. No.: WO2011/022571
PCT Pub. Date: Feb. 24, 2011

(65) Prior Publication Data
US 2012/0186312 A1    Jul. 26, 2012

Related U.S. Application Data

(60) Provisional application No. 61/235,497, filed on Aug. 20, 2009.

(51) Int. Cl.
*H02H 7/09* (2006.01)
*E05B 53/00* (2006.01)
(Continued)

(52) U.S. Cl.
CPC .......... *E05B 47/0001* (2013.01); *E05B 17/22* (2013.01); *E05B 47/00* (2013.01); *E05B 47/0038* (2013.01);
(Continued)

(58) Field of Classification Search
CPC ... E05B 47/00; E05B 17/22; E05B 2047/0054
(Continued)

(56) References Cited

U.S. PATENT DOCUMENTS 4,148,092 A    4/1979  Martin
4,904,005 A    2/1990  Frolov
(Continued)

FOREIGN PATENT DOCUMENTS

CN          2504354      8/2012
DE       202005008396    8/2005
(Continued)

*Primary Examiner* — Eduardo Colon Santana
*Assistant Examiner* — Gabriel Agared
(74) *Attorney, Agent, or Firm* — DeLio, Peterson & Curcio, LLC; Kelly M. Nowak

(57) ABSTRACT

A locking device includes an integrated circuit board specially shaped to fit the locking device and to bring a sensor on the circuit board adjacent to a moving lock component. The circuit board is preferably routed to form a convex shape that matches the locking device and provides printed circuit wiring to connect one or more sensors or other components to an external wiring harness, thereby reducing point-to-point wiring within the lock. Multiple different circuits may be provided on the same circuit board, which are automatically selected by the connectors used on different corresponding wiring harnesses and/or actuators. The design reduces assembly costs and allows rapid electrification of existing mechanical locking devices with minimal modification.

17 Claims, 7 Drawing Sheets

(51) Int. Cl.
  *E05B 15/00* (2006.01)
  *E05B 47/00* (2006.01)
  *E05B 17/22* (2006.01)
  *G01B 7/00* (2006.01)

(52) U.S. Cl.
  CPC ....... *G01B 7/003* (2013.01); *E05B 2047/0054* (2013.01); *Y10T 70/625* (2015.04); *Y10T 70/70* (2015.04); *Y10T 292/57* (2015.04)

(58) Field of Classification Search
  USPC .................................. 361/33; 70/263, 266
  See application file for complete search history.

(56) References Cited

U.S. PATENT DOCUMENTS

| | | |
|---|---|---|
| 5,083,122 A | 1/1992 | Clark |
| 5,475,996 A | 12/1995 | Chen |
| 6,101,856 A | 8/2000 | Pelletier et al. |
| 6,967,562 B2 | 11/2005 | Menard et al. |
| 7,497,486 B1* | 3/2009 | Davis .................. E05B 15/0205 292/169.14 |
| 2003/0094023 A1* | 5/2003 | Emiel Van Parys ............ 70/257 |
| 2003/0160681 A1* | 8/2003 | Menard ................... E05B 45/06 340/5.64 |
| 2003/0209043 A1 | 11/2003 | Yeh et al. |
| 2005/0132766 A1 | 6/2005 | Milo |
| 2006/0192396 A1 | 8/2006 | Frolov et al. |
| 2007/0069894 A1* | 3/2007 | Lee ......................... E05B 45/06 340/542 |
| 2007/0169525 A1* | 7/2007 | Chang ............................. 70/472 |
| 2009/0088775 A1* | 4/2009 | Swarup et al. ................ 606/130 |
| 2009/0193859 A1* | 8/2009 | Kwon et al. ...................... 70/91 |
| 2012/0036904 A1* | 2/2012 | Chang ............................... 70/91 |

FOREIGN PATENT DOCUMENTS

| | | |
|---|---|---|
| DE | 202005006796 | 12/2006 |
| DE | 102006017654 | 10/2007 |
| KR | 100671482 | 1/2007 |
| WO | WO03033845 | 4/2003 |
| WO | WO03042475 | 5/2003 |
| WO | WO2005066913 | 7/2005 |

\* cited by examiner

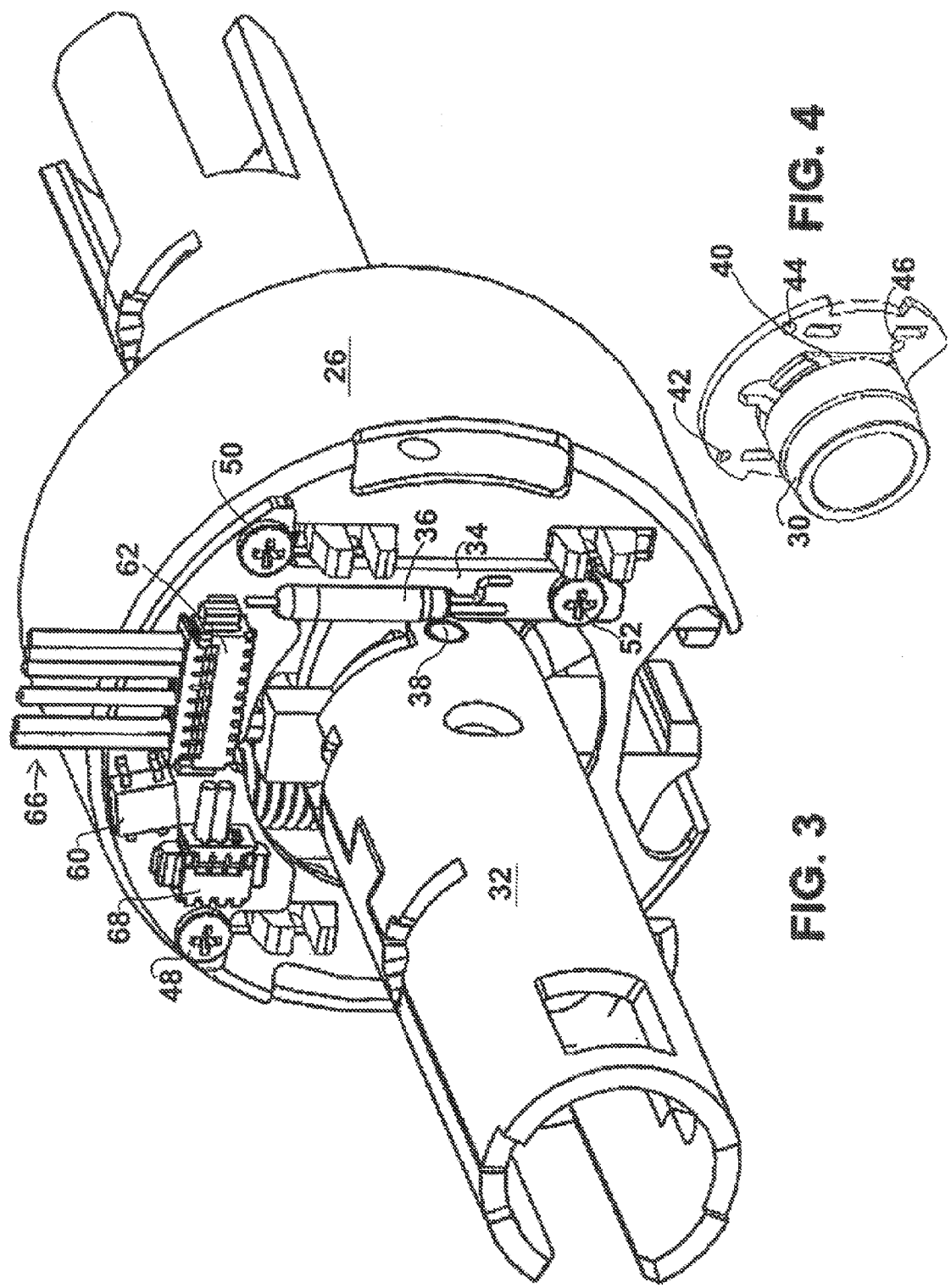

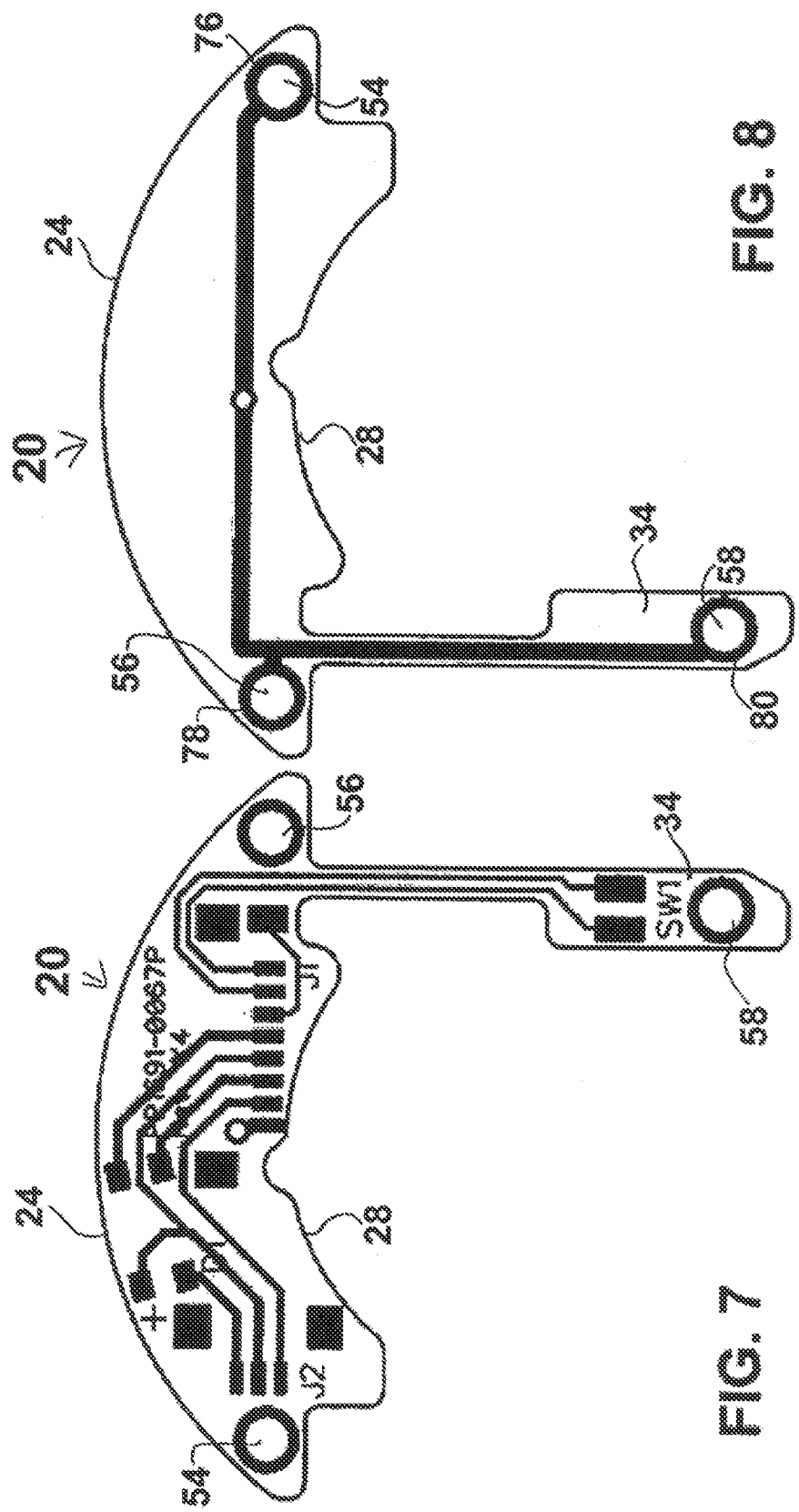

LOCKING DEVICE WITH INTEGRATED CIRCUIT BOARD

TECHNICAL FIELD

The present invention relates to locking devices with integrated electronic components, such as actuators, switches and sensors. More specifically, the present invention relates to locking devices having an integrated printed circuit board with electronic components mounted on the circuit board that interact with mechanical components of the locking device.

BACKGROUND ART

Over the past two decades, access control technology in locking devices has rapidly shifted from traditional mechanical keying systems and mechanical articulation to digital monitoring and electronic actuation. The primary method of "electrifying" an existing mechanical lock is to mount individual sensing switches and actuators within the locking device, then route discrete wiring from the switches and actuators through the lock and out to an external harness or connector.

There are many disadvantages to this approach including: the considerable component design differences between high-volume mechanical configurations and low volume "electrified" configurations (produced at increased cost), and performance limitations imposed when packaging switches, actuators, and wire harnesses within existing mechanical locking devices.

DISCLOSURE OF INVENTION

This invention allows for "electrification" of an existing mechanical locking device without significant mechanical redesign, challenging wire routing, and the limitations of switch or actuator positioning. A printed circuit board, having a non-rectangular perimeter, is specially shaped to fit onto or within a mechanical lock. The circuit board is specially shaped and electronic components are mounted thereon in order to meet multiple requirements.

A first requirement is that the circuit board does not interfere with the motion of mechanical components of the locking device. Another requirement is that the circuit board fits within the limits imposed by the opening in the door for receiving the locking device and/or within the locking device itself. This may be achieved by mounting the circuit board inside the locking device or by mounting it in close contact with the exterior thereof.

Yet another requirement is that the circuit board must be shaped to bring sensors, motors or other actuators close to a corresponding moving component in the locking device. The sensors, motors, actuators and associated electronic components are preferably mounted on the circuit board. The circuit board is then mounted on or in the locking device. The shape of the circuit board, coupled with the position of the sensors or motors thereon, ensures that the sensors, actuators and/or motors are all quickly and accurately positioned relative to their associated lock component when the circuit board is installed.

A final requirement is that the circuit board must be shaped to provide wiring for the electronic components. The electronic components may be sensors, motors, actuators, power connectors and/or other connectors for associated electronics. In the preferred design, at least one non-contact sensor, such as a magnetically operated reed switch or a Hall-effect sensor is directly mounted to the circuit board and the circuit board is shaped to bring the sensor immediately adjacent to a moving component to be monitored.

Preferably, the moving component to be monitored is provided with a magnet that produces a magnetic field sensed by the reed switch or Hall-effect sensor.

In order to meet the multiple requirements for the circuit board, the circuit board preferably has a concave perimeter allowing it to wrap around at least one or more locking device components. The concave shape of the circuit board defines one or more concave regions or bays in the perimeter of the circuit board. The circuit board may also have one or more projections extending outward from the perimeter of the circuit board.

As used herein, an object has a "convex" shape if, for every pair of points within the perimeter of the object, every point on the straight line segment that joins them is also within the object. An object has a "concave" shape if it is not convex. For example, rectangular, circular and oval perimeter circuit boards have a convex shape. Circuit boards with a perimeter in the form of a crescent or a star have a concave shape.

The circuit board may have one or more external edges forming the perimeter thereof that correspond to the shape of the locking device. One or more other edges of the circuit board define concave regions, bays or outward projections to carry electronic components and/or wiring, while avoiding interference with moving lock components or the mounting for the lock. These specially shaped concave circuit boards are preferably formed by routing the perimeter of the board to match the shape of the lock mechanism they will be mounted to.

By specially shaping the circuit board, existing mechanical locking devices can be electrified with minimal modification. A designer can implement precise sensing, actuation, and electrical connectivity efficiently.

Thus a locking device according to the present invention includes a circuit board directly attached to the locking device having a shape as described above to meet the various requirements imposed. One or more sensors, preferably non-contact sensors, are mounted on the circuit board in locations which allow each sensor to be close to a corresponding moving lock component. When the circuit board is mounted to the exterior of the locking device, a corresponding opening is formed in the housing of the locking device adjacent a moving component to be sensed and the sensor extends into this opening into close proximity with the moving component.

In a preferred design, the locking device is a bored lock (also referred to as a "cylindrical lock") having a cylindrical outer surface that fits within a corresponding cylindrical lock opening in a door. The circuit board is mounted to the outer surface of the lock and the perimeter of the circuit board includes an outer edge corresponding to the cylindrical outer surface of the lock.

In this design, the perimeter of the circuit board has a concave shape, which partially wraps around a central axis of the locking device. The circuit board also includes one or more projections for mounting a sensor.

Once the PCB is designed-into the assembly, sensors (preferably non-contact) are positioned near mechanical components that need to be monitored. Typically the mechanical components are monitored for position to detect when the door has been opened, or when the locking device has been moved into or out of the locked position, etc. If non-contact sensors are utilized (e.g., Hall-effect or reed sensors), the mechanical components may have small magnets embedded inside them. Alternate sensors may be utilized that do no require a magnet for trigger (e.g., Magnasphere or mechanical micro-switches).

Actuators are also connected directly and positioned in close proximity to the PCB. The actuator may be directly mounted to the PCB or it may be connected to a connector mounted on the circuit board. Typical actuators utilized for locking devices include brush DC motors and solenoids; but stepper motors, shape memory actuators, and piezo motors may be alternatively implemented. If increased electrical current is required (typically for a solenoid lock), traces may be routed through a middle PCB layer or the board may be conformal coated to protect external circuits (typical).

The PCB design also allows complex circuits to be integrated into a single assembly (as opposed to what can be wired into a harness). Cost advantages exist due to the ability to outsource the entire electrical assembly for modular configuration with mechanical products. If low profile is required, a flex circuit can be utilized in place of a PCB but is not preferred due to added cost of this solution. The present invention allows multiple components to be mounted on a single printed circuit board within the locking device, including but not limited to: sensing, actuation, circuit routing, connectivity, signal conditioning (e.g., AC rectification), communications, logic control, micro-processing, signaling (e.g., LED), and standardized connectorization to external circuits. Embedded wireless or cellular circuits are also possible with this design (potentially requiring an external antenna).

In one aspect of the invention, the locking device includes a lock mechanism having a moving lock component to be monitored and a circuit board having a non-rectangular perimeter mounted to the lock mechanism. The non-rectangular perimeter is shaped to fit the circuit board to the lock mechanism. The component mounting surface of the circuit board is located near the moving lock component when the circuit board is mounted to the lock mechanism and at least one sensor is mounted to the component mounting surface of the circuit board such that the sensor is located adjacent to the moving lock component.

The perimeter of the circuit board is preferably concave and partially surrounds the moving lock component. In one embodiment, the moving lock component is a spindle rotated by a handle and the concave perimeter of the circuit board partially surrounds a bearing through which the spindle passes.

In another aspect, the circuit board includes one or more outward projections and the sensor is mounted thereon. The sensor is preferably a non-contact sensor such as a magnetically operated reed switch or a Hall-effect sensor. The circuit board is preferably shaped by routing to correspond the shape of the circuit board to the maximum space available and to the interior or exterior shape of the locking device.

In another aspect, the circuit board has a connector with a plurality of connection points defining at least two different sets of connection points. The connector can be connected to at least two different wiring harnesses, such as for a motor or a solenoid and different connections are made depending on the wiring harness that is connected. In a related aspect, the circuit board is provided with a full wave rectifier to provide DC power to a solenoid actuator when AC power is connected.

In yet another aspect, the circuit board includes one or more mounting openings and printed circuit wiring that cooperates therewith to make an electrical connection to the locking device.

BRIEF DESCRIPTION OF THE DRAWINGS

FIGS. 3 and 4 show the same perspective view of the bored lock seen in FIG. 1, except that the bearing sleeve has been removed in FIG. 3 to better show the circuit board, sensor and electronics. The bearing sleeve removed from FIG. 3 is separately shown in FIG. 4 (at a reduced scale).

FIGS. 7 and 8 are elevational views of the front and back surfaces of the circuit board seen in FIGS. 5 and 6 except that all components have been removed and only the printed wiring on the circuit board is shown.

DESCRIPTION OF THE PREFERRED EMBODIMENT(S)

Figure 1:
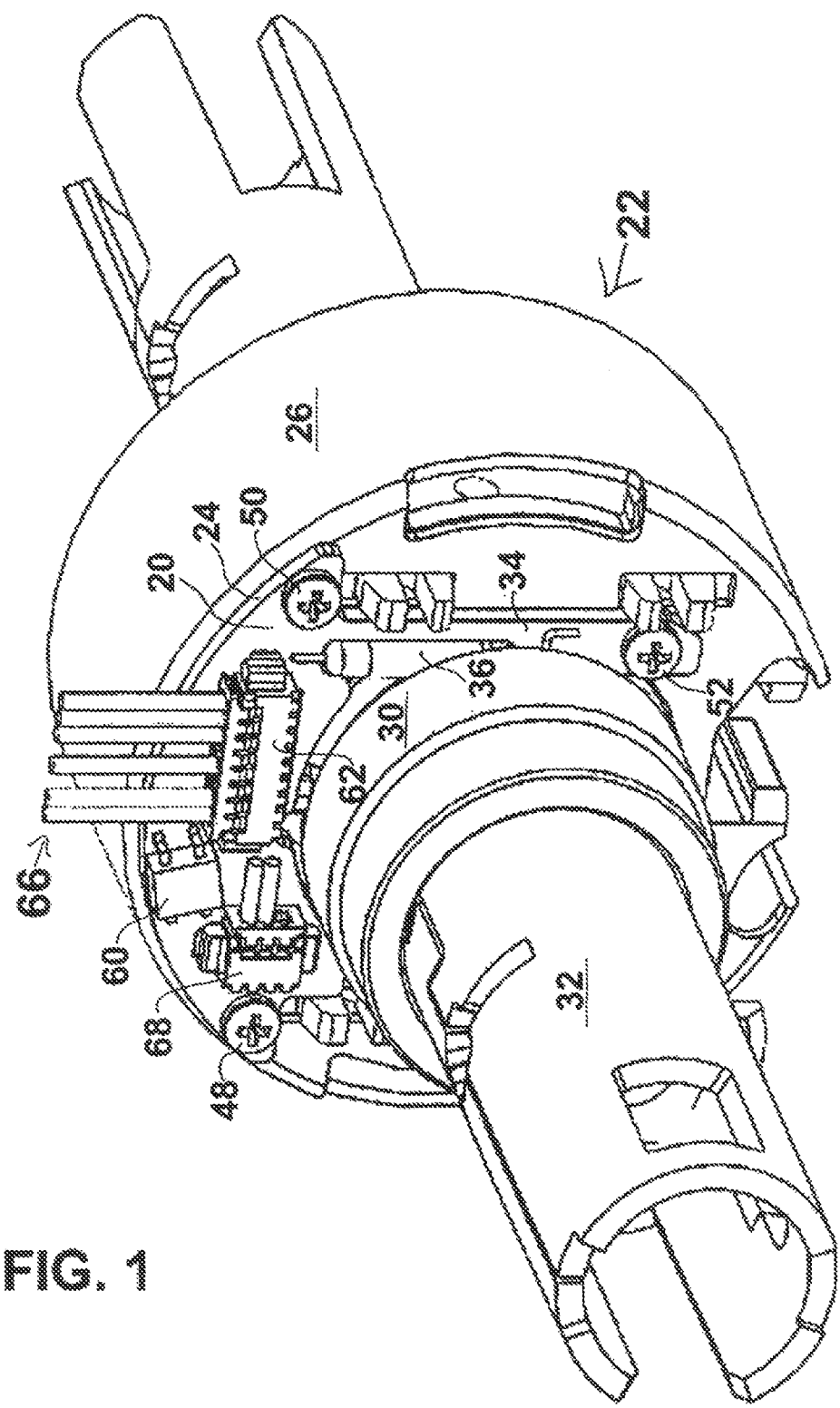
FIG. 1 is a perspective view of a bored lock according to the present invention taken from the upper left.
Figure 2:
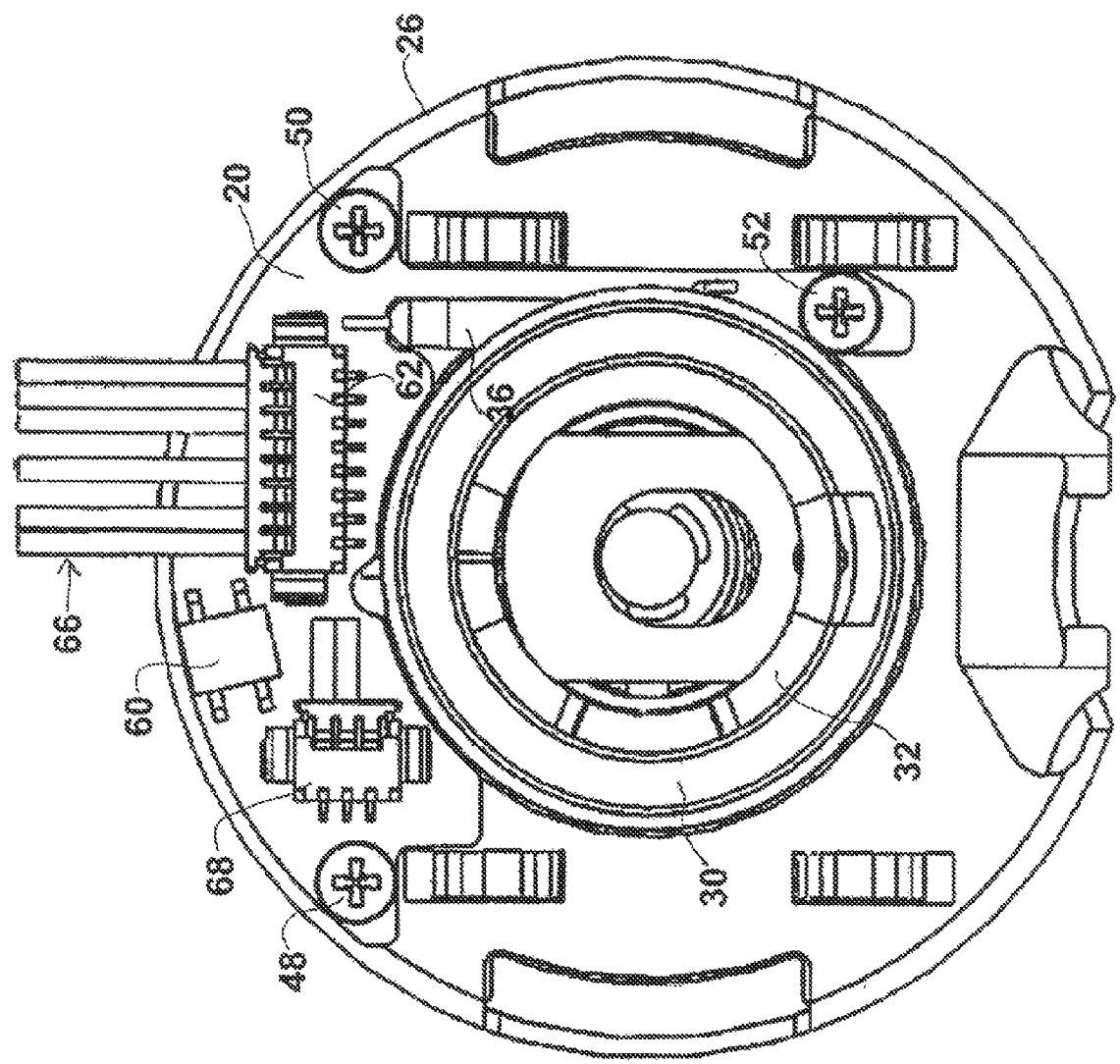
FIG. 2 is an elevational view of the bored lock in FIG. 1 from the left side of FIG. 1.
Figure 5:
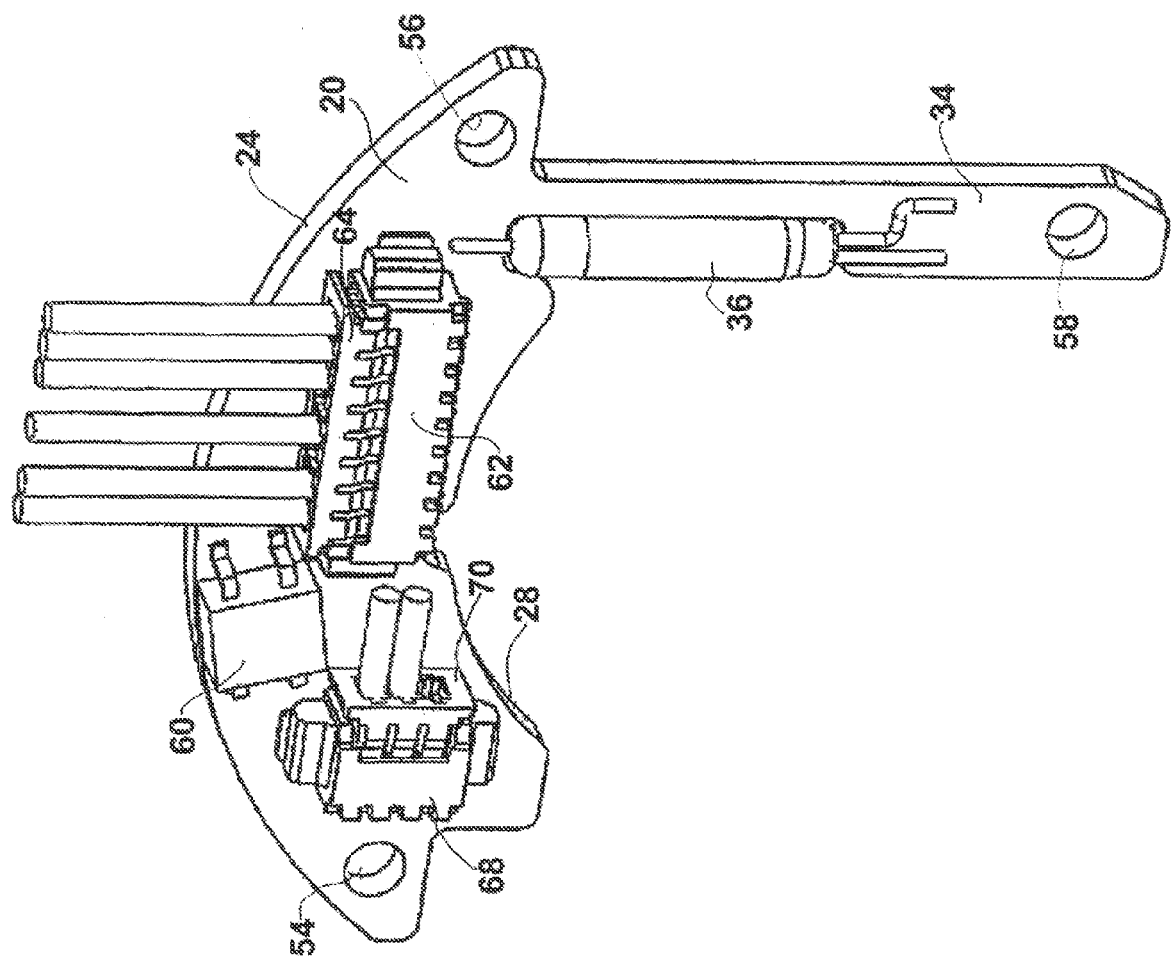
FIG. 5 is a perspective view of the circuit board seen in FIG. 1. The circuit board is shown in isolation after it has been removed from the bored lock in FIG. 1.
Figure 6:
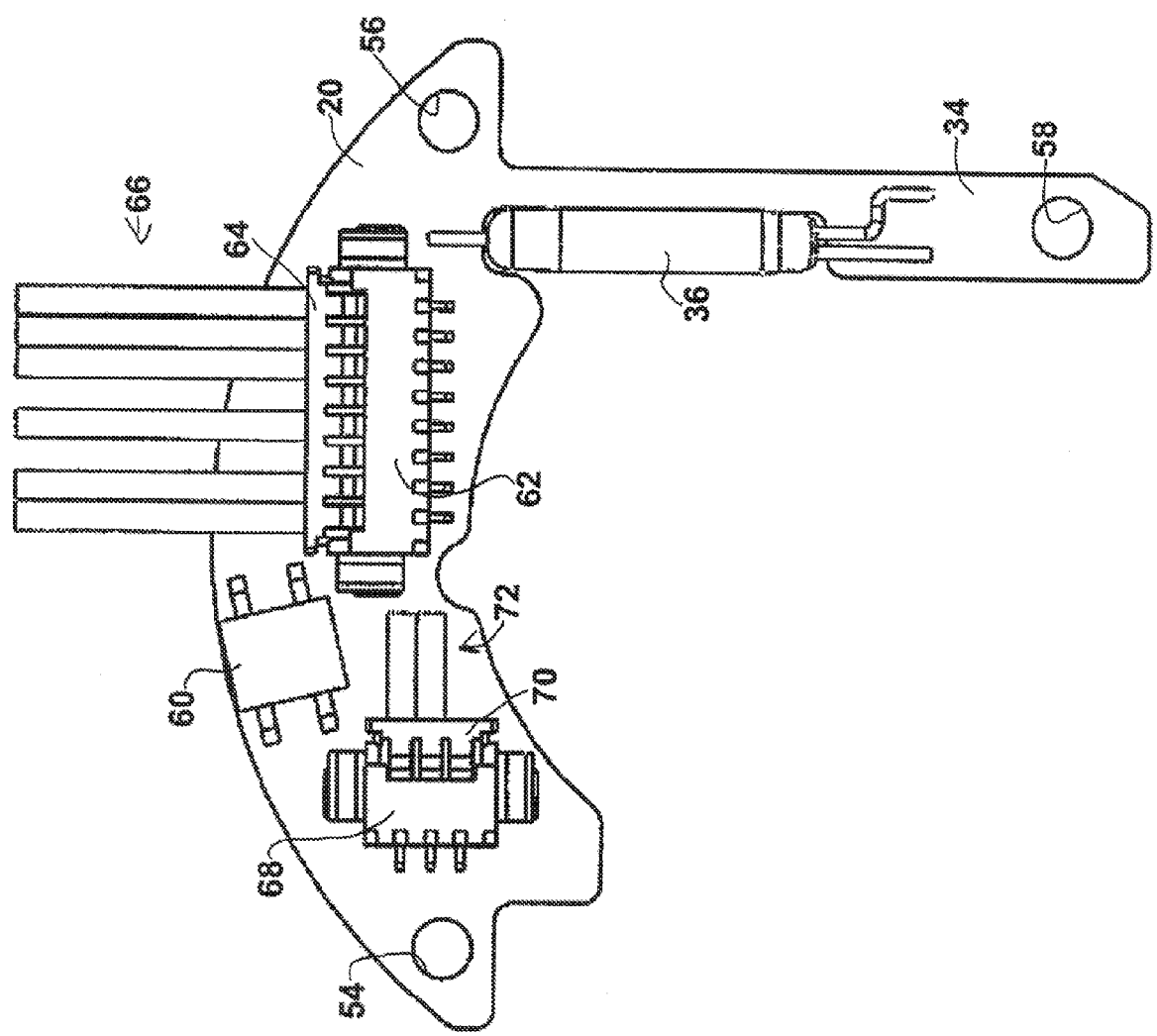
FIG. 6 is an elevational view of the circuit board seen in FIG. 5.

In describing the preferred embodiment of the present invention, reference will be made herein to FIGS. 1-9 of the drawings in which like numerals refer to like features of the invention.

Although the description below relates to a bored lock design with a cylindrical outer surface where the circuit board is mounted to the exterior of the lock, the invention is also applicable to other lock mechanisms, such as mortise locks, and the circuit board may also be mounted to the interior of the lock.

In the design shown in FIGS. 1-8, a printed circuit board (PCB) 20 is attached to and partly embedded in a mechanical lock 22. The circuit board 20 has a routed outside shape and a thickness designed to: minimize modification of mechanical components, avoid moving parts within the assembly, and ensure optimal positioning of any required sensors or actuators.

The perimeter of the circuit board 20 includes an outer curved edge 24 that matches the curved outer cylindrical surface 26 of the lock 20. An inwardly curved edge 28 (see FIG. 5) accommodates bearing 30 (see FIG. 4) through which the spindle 32 passes. The spindle 32 is conventional and has a handle (not shown) attached thereto.

The circuit board 20 also includes a projection 34 having a sensor 36 mounted thereon. The sensor 36 is preferably a non-contact sensor, and in the design shown, it is a magnetically operated reed switch. The reed switch 36 is operated by a magnet 38 mounted in the spindle 32. This can be seen best in FIG. 4 where the bearing 30 has been removed to show the relative location of the magnet 38 and the sensor 36.

FIG. 4 shows the bearing 30 that has been removed from FIG. 3. The bearing 30 is substantially the same as the bearing used in the original, non-electrified, version of this lock, except that a slot 40 has been cut into it to receive the projection 34 and sensor 36 from the circuit board. Slot 40 exposes the magnet 38 as it rotates adjacent to the sensor 36.

Slot 40 allows the sensor to be mounted within a few thousandths of an inch of the magnet 38.

Preferably, the magnet 38 is a small cylindrical magnet inserted into a drilled opening in the moving component being monitored. The magnet 38 has a diameter slightly less than the diameter of the drilled opening that receives it and is inserted into the opening with the cylindrical axis of the magnet oriented along the cylindrical axis of the drilled opening. The magnet 38 is inserted into the opening until an upper surface of the magnet is flush with or just slightly protruding from the surface of the moving component. This allows the magnet 38 to be added to substantially any moving mechanical component in the locking device without interfering with the motion thereof.

Slot 40 also provides support to the projection 34 as the projection engages the slot and is captured therein. The circuit board 20 is securely mounted to the bearing 30 with three mounting screws 48, 50 and 52 (see FIG. 3) that extend through mounting holes 54, 56 and 58 (see FIG. 5) in the circuit board and thread into three corresponding attachment holes 42, 44 and 46 (see FIG. 4) in the bearing.

In addition to the sensor 36, the circuit board includes a full wave bridge rectifier 60, a socket connector 62 for receiving plug connector 64, which has cable 66 connected thereto, which brings power and control signals to the lock and which carries a sensor signal away from the lock. The circuit board also includes socket connector 68, which receives plug connector 70 and cable 72 that connects to an actuator inside the lock.

In the preferred design, it will be noted that the socket connectors 62 and 70 have more connection positions than wires that connect to them. In one embodiment of the invention, the actuator connected to cable 72 is a solenoid actuator, which may be actuated by applying a DC or AC voltage. In another embodiment, the actuator may be a conventional DC brush motor. Other types of actuators may also be used. In each case, the actuator moves a locking element to lock and unlock the door (although other lock elements may be moved in other embodiments of this invention).

In the preferred design, circuit board 20 may be used with solenoid actuators and with motor actuators without modification. The socket connector 68 is wired as indicated in FIG. 9 and the motor actuator is wired differently from the solenoid actuator, but the same plug connector is used for both.

When a solenoid actuator is used, the plug connector 70 is wired so that it connects to the center common pin for positive DC power and to the upper pin for ground. The center and upper pins of the socket connector 70 are connected to the full wave bridge rectifier 60 so that AC or DC voltage may be applied to activate the solenoid. When a motor actuator is used, it connects to the lower two pins in the socket connector 68 and the bridge rectifier 60 is not connected. This allows the motor to be driven in one direction when a positive DC voltage is applied and in the other direction when a negative DC voltage is applied.

As a result, the same circuit board may be used for both solenoid designs and DC motor designs. Other actuators may also be used using similar design principles. Once the actuator plug 70 is connected, the circuitry of FIG. 9 requires that the corresponding wiring harness be connected to socket connector 62. Socket connector 62 uses the same system described above in which some wire connection pins are not used so that a different set of wiring pins can be connected when the wiring harness for the solenoid actuator is connected than when the wiring harness for the DC motor is connected.

Figure 9:
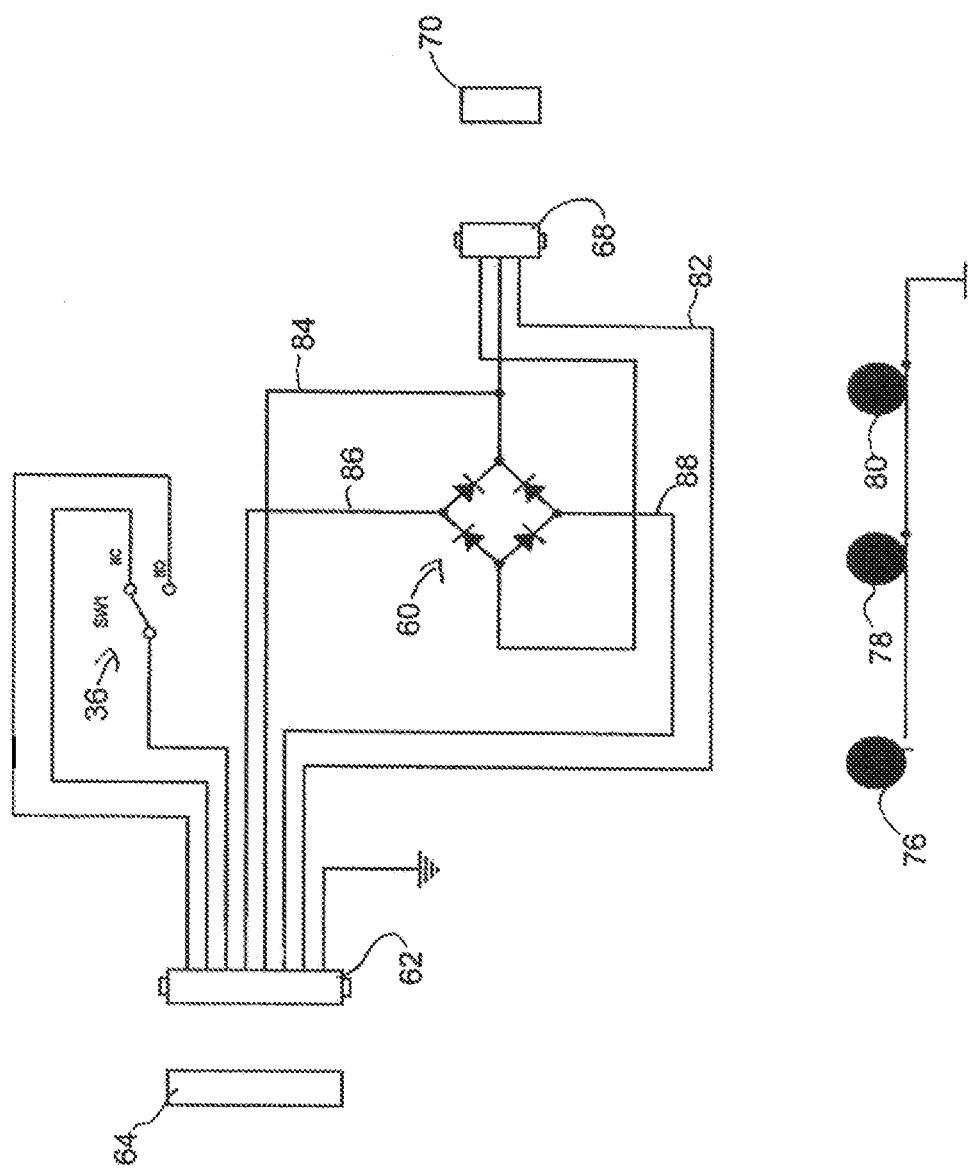
FIG. 9 is a circuit diagram of the circuit on the circuit board of FIGS. 5 and 6. The upper portion shows the circuit on the front surface corresponding to FIGS. 5, 6 and 7, while the lower portion of FIG. 9 shows the grounding circuit on the backside of the circuit board corresponding to FIG. 8.

More specifically, FIG. 9 shows that one of the pins in socket connector 62 is connected directly to a corresponding pin in socket connector 68 with wire 82. This pin is used only for the DC motor design and is not connected when the wiring harness for a solenoid is attached to socket connector 62. Wire 84, which is also used for the DC motor design, is connected between socket connector 62 and the common center pin of socket 68. Wires 82 and 84 are not used when the solenoid wiring harness is connected.

The solenoid wiring harness uses wires 86 and 88 to feed the full wave bridge rectifier. The output of that rectifier feeds the same common pin on socket connector 68 as wire 84. The full wave bridge rectifier provides a positive actuating voltage to the center common pin regardless of whether an AC or DC voltage is applied to wires 86 and 88. Wires 86 and 88 are not connected at socket connector 62 when the DC motor actuator wiring harness is connected.

The sensor reed switch 36 is indicated in FIG. 9 and operates when the handle spindle 32 is rotated to bring the magnet 38 close to the reed switch 36. The reed switch 36 may be configured to be normally open or normally closed.

Referring to FIGS. 7 and 8, the wiring on the surface of the printed circuit board can be seen. The front surface wiring is shown in FIG. 7. The socket connectors, reed switch and bridge rectifier have all been removed. The back surface of the circuit board carries ground connection wiring only. In the preferred design, grounding is automatically achieved when screws 48, 50, 52 are attached. A separate ground wire is not needed. Screws 48, 50, 52 raise a burr on the exterior perimeter of holes 42, 44, 46 of the bearing as they are inserted. As this burr is raised, it contacts ground pads 76, 78, 80 on the back surface of the circuit board 20 (see FIGS. 8 and 9). The screws 48, 50, 52 securely hold the ground pads 76, 78, 80 in contact with the bearing 30 and electrically ground the circuit to the locking device.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A locking device comprising;
a housing;
a moving lock component within the housing;
a motor actuator within the housing for moving the moving lock component;
a circuit board having a projection, the circuit board residing in the interior of the housing mounted adjacent an edge of the housing, the circuit board having an outer perimeter with a first outer perimeter portion thereof shaped to fit adjacent the edge of the housing and a second outer perimeter portion thereof facing the inside of the housing, the second outer perimeter portion having a concave shaped perimeter portion that partially surrounds the moving lock component, a surface of the projection of the circuit board being located adjacent to the motor actuator and being exposed to a surface area of the moving lock component;
a magnet mounted in the surface area of the moving lock component;

a bearing having a bearing slot residing within the housing, the bearing slot receives and provides support to the projection of the circuit board; and a magnetically operated sensor mounted on the surface of the projection of the circuit board, the magnetically operated sensor being located adjacent to the motor actuator and the moving lock component, whereby as the motor actuator moves the moving lock component the magnet moves closer and is exposed to the magnetically operated sensor through the bearing slot residing within the housing to detect movement of the moving lock component.

2. The locking device of claim 1 wherein the sensor is a reed switch.

3. The locking device of claim 1 wherein the sensor is a Hall effect sensor.

4. The locking device of claim 1 wherein the locking device is a cylindrical lock.

5. The locking device of claim 1 wherein the locking device is a mortise lock.

6. A locking device comprising:
a housing;
a bearing having a bearing a slot therein residing within said housing;
a moving lock component within the housing, the moving lock component having an opening in a surface area thereof;
a magnet mounted in the opening of the moving lock component;
a circuit board having an outward projection, the circuit board residing in the interior of the housing mounted adjacent an edge of the housing, the circuit board having an outer perimeter with a first outer perimeter portion thereof shaped to fit adjacent the edge of the housing and a second outer perimeter portion thereof facing the inside of the housing, the second outer perimeter portion having a concave shaped perimeter portion that partially surrounds the moving lock component, a surface of the outward projection of the circuit board is received within and supported by the bearing slot residing within the housing;
a magnetically operated sensor mounted on the surface of the projection of the circuit board, the magnetically operated sensor being located adjacent to the surface area of the moving lock component having the magnet, whereby as the moving lock component moves, the magnet moves closer and is exposed to the magnetically operated sensor through the bearing slot to detect movement of the moving lock component.

7. The locking device of claim 6 wherein the locking device includes a motor actuator within the housing for moving a locking element, with a surface of the circuit board being located adjacent to the motor actuator, and a magnetically operated sensor mounted to the surface of the circuit board adjacent to the motor actuator to monitor movement thereof.

8. The locking device of claim 6 wherein the sensor is a reed switch.

9. The locking device of claim 6 wherein the sensor is a Hall effect sensor.

10. The locking device of claim 6 wherein the locking device is a cylindrical lock with the moving lock component comprising a rotating spindle having the magnet inserted into an opening therein.

11. The locking device of claim 6 wherein the locking device is a mortise lock.

12. A locking device comprising;
a housing;
a moving lock component within the housing, the moving lock component having an opening provided in a surface area thereof;
a magnet inserted within the opening of the moving lock component:
a circuit board with an outward protection having a sensor mounted thereon, the circuit board residing in the interior of the housing mounted adjacent an edge of the housing, the circuit board having an outer perimeter that defines the exterior dimensions of the circuit board with a first outer perimeter portion thereof shaped to fit adjacent the edge of the housing and a second outer perimeter portion thereof facing the inside of the housing, the second outer perimeter portion having a concave shaped perimeter portion that partially surrounds the moving lock component;
a bearing having a bearing slot residing within said housing, the bearing slot receiving and providing support to the outward projection of the circuit board and receiving the sensor mounted on said outward projection, whereby on movement of the moving lock component the magnet moves closer to the sensor and is exposed through the bearing slot for detection by the sensor to monitor movement of the moving lock component.

13. The locking device of claim 12 wherein the locking device includes a motor actuator within the housing for moving a locking element, with a surface of the circuit board being located adjacent to the motor actuator, and a magnetically operated sensor mounted to the surface of the circuit board adjacent to the motor actuator to monitor movement thereof.

14. The locking device of claim 12 wherein the sensor is a reed switch.

15. The locking device of claim 12 wherein the sensor is a Hall effect sensor.

16. The locking device of claim 12 wherein the locking device is a cylindrical lock.

17. The locking device of claim 12 wherein the locking device is a mortise lock.

* * * * *

UNITED STATES PATENT AND TRADEMARK OFFICE
CERTIFICATE OF CORRECTION

PATENT NO. : 9,528,295 B2
APPLICATION NO. : 13/391025
DATED : December 27, 2016
INVENTOR(S) : Scott B. Lowder et al.

Page 1 of 1

It is certified that error appears in the above-identified patent and that said Letters Patent is hereby corrected as shown below:

In the Claims

In Column 8, Line 34, delete "on" and substitute therefore -- upon --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*